United States Patent
Onodera et al.

(10) Patent No.: US 8,646,254 B2
(45) Date of Patent: Feb. 11, 2014

(54) EXHAUST EMISSION PURIFICATION METHOD AND EXHAUST EMISSION PURIFICATION SYSTEM

(75) Inventors: Takao Onodera, Fujisawa (JP); Akira Hirata, Fujisawa (JP); Takashi Haseyama, Fujisawa (JP); Shinji Gotou, Fujisawa (JP); Hitoshi Satou, Fujisawa (JP); Tatsuo Mashiko, Fujisawa (JP); Futoshi Nakano, Fujisawa (JP); Kouichirou Yomogida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 620 days.

(21) Appl. No.: 12/449,071

(22) PCT Filed: Dec. 19, 2007

(86) PCT No.: PCT/JP2007/074442
§ 371 (c)(1),
(2), (4) Date: Jul. 22, 2009

(87) PCT Pub. No.: WO2008/090698
PCT Pub. Date: Jul. 31, 2008

(65) Prior Publication Data
US 2010/0011750 A1   Jan. 21, 2010

(30) Foreign Application Priority Data
Jan. 26, 2007   (JP) .................................. 2007-015854

(51) Int. Cl.
*F01N 3/00*   (2006.01)
(52) U.S. Cl.
USPC .................................. 60/295; 60/297; 60/287
(58) Field of Classification Search
USPC ............................. 60/285, 286, 295, 311, 297
See application file for complete search history.

(56) References Cited

U.S. PATENT DOCUMENTS

| | | | | |
|---|---|---|---|---|
| 5,287,698 A | * | 2/1994 | Shinzawa et al. | 60/286 |
| 2002/0112472 A1 | * | 8/2002 | Tashiro et al. | 60/295 |
| 2004/0139852 A1 | | 7/2004 | Koga et al. | |
| 2005/0039444 A1 | * | 2/2005 | Nishizawa et al. | 60/285 |
| 2005/0217252 A1 | | 10/2005 | Sato et al. | |

(Continued)

FOREIGN PATENT DOCUMENTS

EP   1 584 808   12/2005
EP   1 741 892   1/2007

(Continued)

OTHER PUBLICATIONS

English Translation of JP-2007-274906.*

(Continued)

*Primary Examiner* — Thomas Denion
*Assistant Examiner* — Patrick Maines
(74) *Attorney, Agent, or Firm* — Staas & Halsey LLP (57) ABSTRACT

Forced regeneration start timing of a diesel particulate filter for purifying particulate matter in exhaust gas is judged based on a comparison of a differential pressure across the diesel particulate filter with a predetermined differential pressure threshold across the filter. The predetermined differential pressure threshold is set by multiplying a reference differential pressure threshold by a coefficient which varies stepwise or continuously depending on a mileage of a vehicle after previous forced regeneration. Consequently, particulate matter can be removed by burning while the amount of particulate matter accumulated unevenly in the filter is still small, and excessive temperature rise in the filter resulting from excessive accumulation of particulate matter during forced regeneration and melting-loss of the filter due to excessive temperature rise can be prevented.

10 Claims, 7 Drawing Sheets

(56) References Cited

U.S. PATENT DOCUMENTS

| | | | |
|---|---|---|---|
| 2005/0223701 A1* | 10/2005 | Sato et al. | 60/295 |
| 2006/0005532 A1* | 1/2006 | Kitahara | 60/285 |
| 2006/0032217 A1* | 2/2006 | Kondou et al. | 60/297 |
| 2006/0137327 A1* | 6/2006 | Shirakawa et al. | 60/285 |
| 2006/0179826 A1* | 8/2006 | Kuboshima et al. | 60/297 |
| 2007/0131193 A1* | 6/2007 | Takahashi | 123/196 AB |
| 2008/0163609 A1* | 7/2008 | Satou et al. | 60/287 |

FOREIGN PATENT DOCUMENTS

| | | |
|---|---|---|
| JP | 8-210122 | 8/1996 |
| JP | 2004-218486 | 8/2004 |
| JP | 2005-256628 | 9/2005 |
| JP | 2005-282545 | 10/2005 |
| JP | 3824003 | 9/2006 |
| JP | 2006-274906 | 10/2006 |
| JP | 2006274906 A * | 10/2006 |

OTHER PUBLICATIONS

International Search Report for PCT/JP2007/074442, mailed Mar. 4, 2008.

European Office Action dated Apr. 27, 2012 in Appln. No. 07 85 0912.

* cited by examiner

EXHAUST EMISSION PURIFICATION METHOD AND EXHAUST EMISSION PURIFICATION SYSTEM

CROSS REFERENCE TO RELATED APPLICATIONS

This application claims the benefit under 35 U.S.C. Section 371, of PCT International Application Number PCT/JP2007/074442, filed Dec. 19, 2007 and Japanese Application No. 2007-015854 filed Jan. 26, 2007, the contents of which are incorporated herein by reference.

TECHNICAL FIELD

The present invention relates to an exhaust emission purification method and an exhaust emission purification system which judges forced regeneration start timing of a DPF (diesel particulate filter) based on the differential pressure across the DPF with the predetermined differential pressure threshold across the DPF. More particularly, the present invention relates to an exhaust emission purification method and an exhaust emission purification system enabling to remove the PM (particulate matter) accumulated unevenly, in which the PM can be removed by burning while the amount of PM accumulated unevenly in the DPF is still small, consequently excessive temperature rise in the DPF resulting from excessive accumulation of PM during forced regeneration and melting-loss of DPF due to excessive temperature rise can be avoided.

BACKGROUND ART

One example of exhaust gas purification device that captures the particulate matter emitted from a diesel engine by a filter which is called a diesel particulate filter is seen in a continuous regeneration type DPF device.

In the continuous regeneration device, when the exhaust gas temperature is equal to or higher than approximately 350° C., PM captured by a filter burns continuously to be purified and the filter is regenerated by itself. However, when the exhaust temperature is low in a case of low speed with low load, catalyst is not activated due to catalyst temperature drop and thereby it becomes difficult to perform self-regeneration of the filter through oxidation of PM. Owing to this, clogging is promoted due to accumulation of PM in the filter, resulting in a problem of back pressure increase caused by the clogging.

Therefore, when the accumulated amount of PM in the filter surpasses a predetermined amount (threshold), a forced regeneration requiring forced combustion removal of captured PM is carried out. In the forced regeneration, the exhaust gas temperature is raised forcibly via multi-injection (multistage delay injection) or post injection (after injection) and the like. That is, HC (hydrocarbon) is burnt by oxidation catalyst disposed upstream side of the filter or oxidation catalyst supported by the filter. Through utilization of the oxidation reaction heat, the exhaust gas temperature at the filter entrance or the filter surface is raised. The filter temperature is raised higher than the temperature, at which accumulated PM in the filter burns by this temperature rise, and thereby, the PM combustion removal is performed.

There are two cases in this forced regeneration, one is manual and the other is automatic. In a case of manual regeneration, when the clogging of the filter surpasses the predetermined amount, a warning is given to the driver and the driver who receives the warning pushes a button to start the forced regeneration to perform it. On the other hand, in a case of automatic, when the clogging of the filter surpasses a predetermined amount, no warning is given to the driver, but the forced regeneration is performed automatically even during driving.

As an example of such an exhaust emission purification system, for instance, just as Japanese Patent Application Kokai Publication 2005-256628 and the Japanese Patent Publication 3824003 disclose, such an exhaust emission purification system has been proposed that forced regeneration start timing is judged in manual or automatic regeneration, combining judgment by a detecting means of PM captured amount (differential pressure across DPF or elapse of a certain time duration) and judgment by mileage after the previous force regeneration operation of DPF.

Figure 6:
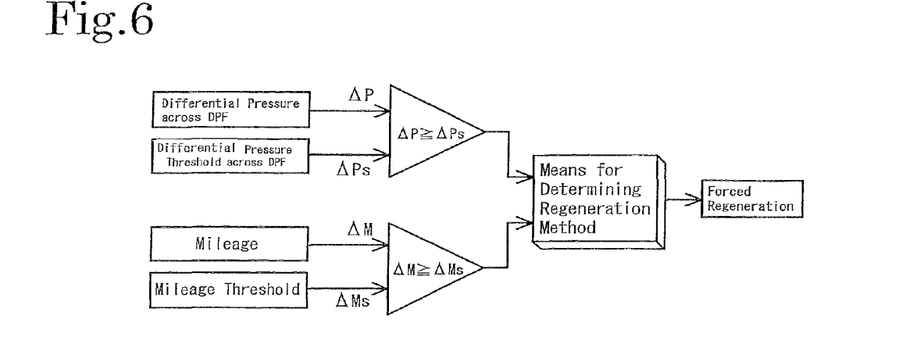
FIG. 6 shows an example of flow of forced regeneration start judgment according to the prior art.

In such an exhaust emission purification system, differential pressure across DPF and the mileage after a forced regeneration are used to judge whether the forced regeneration of DPF is necessary or not, and a control shown in FIG. 6 is carried out. In this control, the differential pressure across DPF $\Delta P$ is compared with the predetermined differential pressure across DPF threshold $\Delta Ps$ and when $\Delta P \geq \Delta Ps$ is satisfied, the procedure goes to the determination means of regeneration method. In addition, the mileage $\Delta M$ after forced regeneration is compared with the predetermined mileage threshold $\Delta Ms$ and when $\Delta M \geq \Delta Ms$ is satisfied, the procedure goes to the determination means of regeneration method. That is, when the differential pressure $\Delta M$ across DPF that rises with the increase of the accumulated amount of PM surpasses the predetermined differential pressure threshold $\Delta Ms$, or when the mileage $\Delta M$ after the previous regeneration of DPF surpasses the predetermined mileage threshold $\Delta Ms$, the forced regeneration is judged necessary. As for determination means of regeneration method, whether it should be manual or automatic is determined and the forced regeneration is carried out, if manual regeneration is the case, by means of button operation by the driver, and if automatic is the case, automatically.

Figure 7:
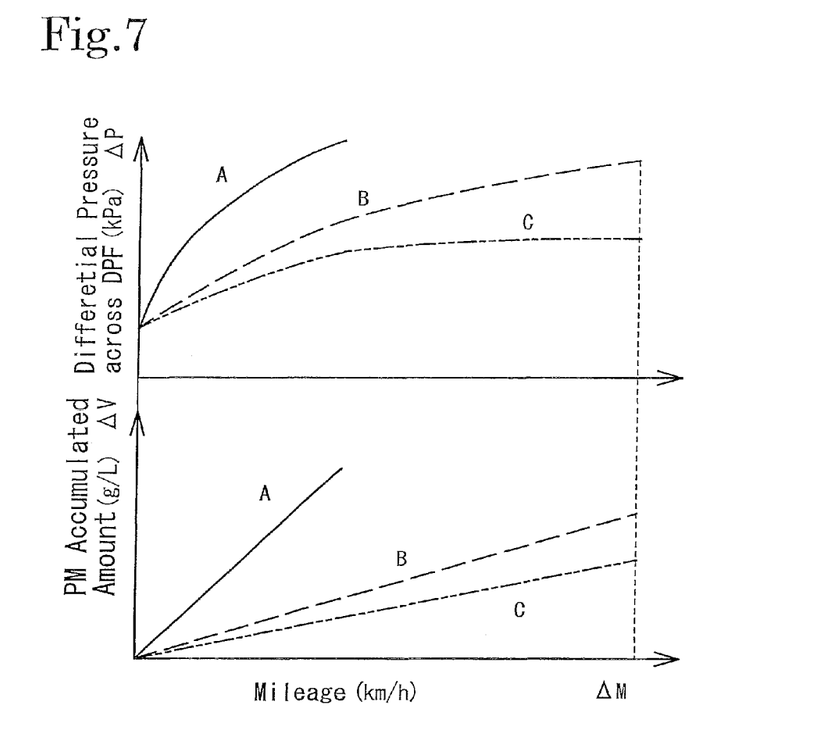
FIG. 7 is a drawing showing the relationship between mileage, PM accumulated amount, and differential pressure across DPF.

As far as the differential pressure across DPF is concerned, it has been considered in the prior art that, as shown in FIG. 7, accompanying with increase of the mileage $\Delta M$, the accumulated amount of PM $\Delta V$ increases and also the differential pressure across DPF $\Delta P$ rises. Consequently, it is assumed that when the accumulated amount of PM $\Delta V$ is increased, the differential pressure across DPF ($\Delta P$) is monotonically increased. Note that in FIG. 7, solid line A shows an example of the case where there is hardly any uneven distribution of PM, dotted line B shows an example of the case where there is uneven distribution of PM and two-dot chain line C shows an example of the case where there is a lot of uneven distribution of PM.

Figure 8:
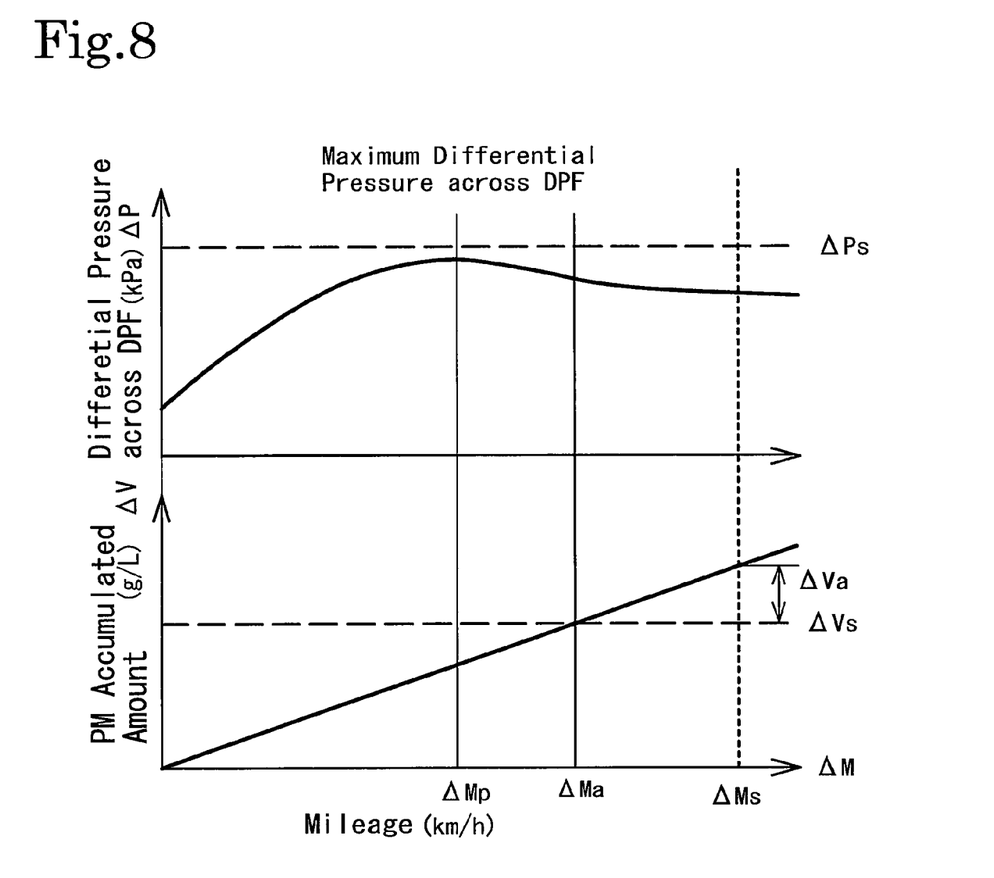
FIG. 8 is a drawing explaining forced regeneration start judgment control and the problem thereof of the prior art.

However, as shown in FIG. 8, it has been discovered that the differential pressure across DPF $\Delta P$ is decreased depending on running pattern despite that the accumulated amount of PM $\Delta V$ is increased. The reason of which is considered that when mileage $\Delta M$ is increased gradually, PM is not accumulated evenly but accumulated unevenly, accordingly the accumulation does not appear in the differential pressure of DPF $\Delta P$.

In such a case, conventional judgment having a constant threshold $\Delta P$ of the differential pressure across DPF can not perform correct judgment of starting of forced regeneration, and accordingly PM is captured by the DPF until the forced regeneration is judged to be necessary through determination using the mileage $\Delta M$ and the mileage threshold $\Delta Ms$. As a result, the forced regeneration could not be carried out through the differential pressure judgment, and thereby, the PM excessively accumulated amount ΔVa captured excessively comes to added on the PM accumulated amount ΔVs for which the forced regeneration is desired.

Consequently, in a case where the differential threshold ΔPs is kept constant, if the interval of forced regeneration is long, or in a long distance driving, PM accumulated amount ΔV may surpass the limitation at the time when the necessity of forced regeneration is judged by the mileage threshold ΔMs. In a case where the limitation is surpassed, the temperature in DPF is raised excessively, which may cause melting-loss of DPF in the worst case. That is to say, when the differential pressure threshold ΔPs to judge forced regeneration start timing is kept constant regardless the mileage ΔM, PM accumulated unevenly in the occasion of forced regeneration burns all at once and the temperature in DPF may rise excessively resulting in melting-loss of DPF.

SUMMARY OF THE INVENTION

The present invention has been accomplished to solve the problems mentioned above, the object of which, in an exhaust emission purification method and an exhaust emission purification system where judgment of forced regeneration start timing of a DPF (diesel particulate filter) for purifying the PM (particulate matters) is performed based on the comparison of a differential pressure across the DPF with a predetermined differential pressure threshold across the DPF, is to provide an exhaust emission purification method and an exhaust emission purification system capable to remove by burning the PM accumulated unevenly in the DPF while the amount of the PM is still small, and thereby excessive temperature rise in DPF and melting-loss of DPF due to the temperature rise caused by excessive accumulation of PM in forced regeneration can be prevented.

The exhaust emission purification method to achieve the object mentioned above is, in exhaust emission purification method which is provided with an exhaust gas purification device having a diesel particulate filter in an exhaust passage in an internal combustion engine, and in which a forced regeneration start timing of said diesel particulate filter is judged based on the comparison of a differential pressure across said DPF with a predetermined differential pressure threshold across the DPF, said differential pressure threshold across the DPF is set by multiplying a reference differential pressure threshold across the DPF by a coefficient which varies depending on mileage of a vehicle after previous forced regeneration.

According to this exhaust emission purification method, since frequency of the forced regeneration is increased compared with the case where the differential pressure threshold across the DPF is set constant regardless the mileage, PM (particulate matters) accumulated unevenly in the DPF can be removed by burning while the accumulated amount is still small with simple algorithm. Thereby, excessive temperature rise in the DPF (heat recklessness) resulting from excessive accumulation of PM during forced regeneration and melting-loss of DPF due to excessive temperature rise can be prevented.

Note that the reference differential pressure across DPF and the coefficient can be obtained to set through test operation or calculation. These data are input to the control unit in advance. The data are set to vary stepwise, continuously, or in combination thereof. In addition, the data are set to keep equal or to become smaller when the mileage of a vehicle becomes larger after the previous forced regeneration. In other words, the coefficient makes the differential pressure threshold across the DPF becomes smaller stepwise or continuously when the mileage on a vehicle becomes larger. This stepwise and continuous variation may be in the full range of mileage or partial range.

In the exhaust emission purification method described above, when a judgment of a forced regeneration start timing based on the comparison of mileage of a vehicle after previous forced regeneration with a predetermined mileage threshold is used, in addition to a judgment of a forced regeneration start timing based on the comparison of the differential pressure across the DPF with the predetermined differential pressure threshold across the DPF, such a case where there is a risk of excessive PM accumulation occurrence using sole judgment by the differential pressure across the DPF can be coped with.

In the exhaust emission purification method described above, when the regeneration includes a manual regeneration which performs a forced regeneration control through receiving a signal of the forced regeneration start that is input by a driver when a forced regeneration start timing is judged, and an automatic regeneration which performs a forced regeneration control automatically when a forced regeneration start timing is judged, the manual regeneration can solve a problem of oil dilution (oil dilution of oil). This problem is an oil dilution problem by mingling unburnt fuel into engine oil (lubrication oil) by the post injection in forced regeneration while driving. In addition, the automatic regeneration, when there is no oil dilution problem, can mitigate annoying in a case of manual regeneration, which is inputting regeneration control start signal by the driver (stopping the vehicle and operation of the regeneration button).

In the exhaust emission purification system to achieve the object described above, which includes an exhaust emission purification device having a DPF in an exhaust passage in an internal combustion engine mounted on a vehicle, and a control unit that judges a forced regeneration start timing of said DPF based on the comparison of a differential pressure across said DPF with a predetermined differential pressure threshold across the DPF and performs forced regeneration repeatedly, the exhaust emission purification system is arranged so that said control unit sets said differential pressure threshold across the DPF by multiplying a reference differential pressure threshold across the DPF by a coefficient which is calculated on a mileage of the vehicle after previous forced regeneration, and the coefficient decreases as the mileage increases.

According to this arrangement, since frequency of the forced regeneration is increased compared with the case where the differential pressure threshold across the DPF is set constant regardless of the mileage, PM accumulated unevenly in the DPF can be removed by burning while the accumulated amount is still small with simple algorithm. Thereby, heat recklessness in the DPF resulting from excessive accumulation of PM during forced regeneration and melting-loss of DPF due to excessive temperature rise can be prevented.

In the exhaust emission purification system described above, when the control unit is arranged such that said control unit uses judgment of a forced regeneration start timing based on the comparison of mileage of a vehicle after previous forced regeneration with a predetermined mileage threshold, in addition to a judgment of a forced regeneration start timing based on the comparison of the differential pressure across the DPF with the predetermined differential pressure threshold across the DPF, even a case where there is a risk of excessive PM accumulation occurrence when using sole judgment by the differential pressure across the DPF can be coped with.

In the exhaust emission purification system described above, when the control unit is arranged such that said control unit carries out a manual regeneration which performs a forced regeneration control through receiving a signal of the forced regeneration that is input by a driver when a forced regeneration start timing is judged and a warning is given to the driver, and an automatic regeneration which performs a forced regeneration control automatically when a forced regeneration start time is judged, the manual regeneration can solve the problem of oil dilution. This problem is an oil dilution problem by mingling unburnt fuel into engine oil by the post injection in forced regeneration while driving in a case of automatic regeneration. In addition, the automatic regeneration, when there is no oil dilution problem, can mitigate annoying in a case of manual regeneration, which is inputting regeneration control start signal by the driver.

It should be noted that, as an example of this exhaust emission purification system, there is such an exhaust emission purification system including an exhaust gas purification device in which the oxidation catalyst device supporting the oxidation catalyst and the DPF are disposed in order from the upstream side in the exhaust passage of an internal combustion engine, and an exhaust gas purification device in which the DPF supporting oxidation catalyst is disposed in the exhaust passage of an internal combustion engine, or the like.

According to the exhaust emission purification method and the exhaust emission purification system according to the present invention, when the forced regeneration start timing of the DPF is judged based on the comparison of the differential pressure across the DPF with a predetermined differential pressure threshold across the DPF, a differential pressure threshold across the DPF is set by multiplying a reference differential pressure threshold across the DPF by a coefficient which varies depending on the mileage of a vehicle after previous forced regeneration.

Owing to this, the differential pressure judgment threshold can be arranged to correspond to the mileage after forced regeneration so as to become smaller when the mileage gets larger, and thus the differential pressure judgment threshold can be lower to increase the frequency of forced regeneration control. Thereby, the PM accumulated unevenly in the DPF can be removed by burning while accumulation amount is still small. Therefore, an excessive capturing of PM, excessive temperature rise (heat recklessness) in the DPF resulting from the excessive capturing during forced regeneration and melting-loss of the DPF caused by the excessive temperature rise can be prevented.

DESCRIPTION OF LETTERS OR NUMERALS

1 exhaust emission purification system
10 diesel engine (internal combustion engine)
11 exhaust passage
12 continuous regeneration type DPF device
12a oxidation catalyst
12b catalyst-carried filter
31 differential pressure sensor
40 control unit (ECU)
$\Delta P$ differential pressure across DPF
$\Delta Ps$ differential pressure threshold across DPF
$\Delta Ps0$ reference differential pressure threshold across DPF
$\Delta M$ mileage of vehicle after previous forced regeneration
$\Delta Ms$ mileage threshold
$\Delta M1$ first mileage
$\Delta M2$ second mileage
$\Delta V$ accumulated amount of PM
$\Delta Va$ excessive accumulated amount of PM
$\Delta Vs$ accumulated amount of PM desiring forced regeneration
$\alpha(c)$, $\alpha(\Delta M)$ coefficient
$\alpha 1$, $\alpha 2$, $\alpha 3$, $\alpha 4$ coefficient value

DESCRIPTION OF THE EMBODIMENTS

Figure 1:
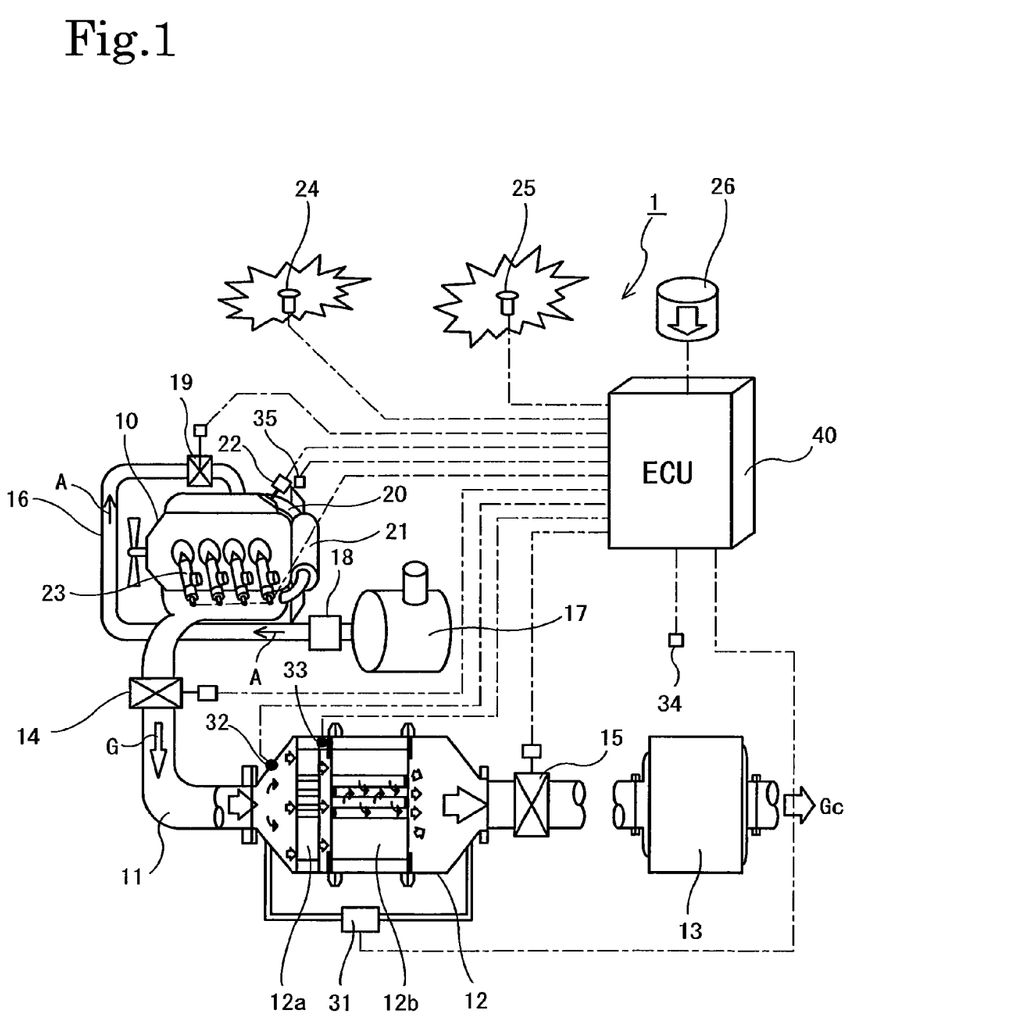
FIG. 1 shows an overall structure of the exhaust emission purification system of an embodiment according to the present invention.

Hereinafter, the exhaust emission purification method and the exhaust emission purification system according to embodiments of the present invention will be described referring to the drawings. FIG. 1 shows a structure of the exhaust emission purification system 1 according to an embodiment.

This exhaust emission purification system 1 is composed of an exhaust gas purification device 12 and a silencer 13 which are disposed in an exhaust passage 11 of a diesel engine (internal combustion engine) 10. This exhaust gas purification device 12 is one of continuous regeneration-type DPF (Diesel Particulate Filter) devices. This exhaust gas purification device 12 is composed of an oxidation catalyst device 12a disposed in the upstream side and a catalyst-carried filter device (DPF) 12b disposed in the downstream side.

The oxidation catalyst device 12a is formed so that an oxidation catalyst such as platinum is carried on a supporting body with honeycomb structure made of porous ceramics and the like. The catalyst-carried filter device 12b is formed by a wall-flow type filter of monolith honeycomb structure, which is arranged so that the entrance and outlet of porous ceramics honeycomb channels are alternatively sealed. Catalysts such as platinum or cerium oxide are carried on a part of the filter. The porous ceramic wall captures PM (particulate matter) in the exhaust gas.

In order to estimate the amount of accumulated PM in the catalyst-carried filter device 12b, a differential pressure sensor 31 is provided in a conduction pipe connected at the front and rear of the exhaust gas purification device 12. In addition, in the upstream side of the exhaust gas purification device 12 an exhaust brake valve (exhaust brake) 14, and in the downstream side an exhaust throttle valve (exhaust throttle) 15 is provided.

In an intake passage 16, an air cleaner 17, MAF sensor (intake air volume sensor) 18, and intake throttle valve (intake throttle) 19 are provided. The intake throttle valve 19 controls the volume of intake air A to the intake manifold. Further, in EGR passage 20, EGR cooler 21 and EGR valve 22, which controls EGR volume, are provided.

Still further, in order to control the forced regeneration of the catalyst-carried filter device 12b, an exhaust gas temperature sensor 32 for the oxidation catalyst entrance is provided at the upstream side of the oxidation catalyst device 12a and an exhaust temperature sensor 33 for the filter catalyst entrance is provided between the oxidation catalyst device 12a and the catalyst-carried filter device 12b. The exhaust gas temperature sensor 32 for the oxidation catalyst entrance detects the exhaust gas temperature Tg1 at the oxidation catalyst entrance, which is the temperature of the exhaust gas flowing into the oxidation catalyst device 12a. The exhaust gas temperature sensor 33 for the filter catalyst entrance detects the exhaust gas temperature Tg2 at the filter entrance, which is the temperature of the exhaust gas flowing into the catalyst-carried filter device 12b.

Output values from these sensors are input to the control unit (ECU: Engine Control Unit) 40, which controls the operation of the engine 10 generally as well as controls forced regeneration of the exhaust gas purification device 12. Control signals that are output from the control unit 40 control the exhaust throttle valve 14, inlet air throttle valve 15, inlet throttle valve 19, EGR valve 22, fuel injection device (injection nozzle) 23, and the like.

The fuel injection device 23 is connected to the common rail injection system (not shown) which temporarily reserves highly pressurized fuel by the fuel pump (not shown). To the control unit 40, such information as an accelerator opening from accelerator position sensor (APS) 34, engine speed from an engine speed sensor 35 as well as the information such as vehicle speed, coolant temperature, and the like are input for operation of the engine 10. In addition, electric current passage duration signal is output from the control unit 40 so that predetermined amount of fuel is injected from the fuel injection device 23.

A flasher (DPF lump) 24 which is a warning means to attract attention, an emergency light lump 25 and a manual regeneration button (manual regeneration switch) 26 are provided. These call the attention of the driver when the captured amount of PM in the catalyst-carried filter 12b surpasses the predetermined amount and clogging of the catalyst-carried filter 12b occurs. The driver who is urged attention stops the vehicle voluntarily to perform forced regeneration. In this way, in the forced regeneration control of the exhaust gas purification device 12, not only automatic regeneration while driving but also manual regeneration by the driver can become available.

In controlling of the exhaust emission purification system 1, PM is captured in a normal operation. In the normal operation, whether it is the time to start the forced regeneration or not is monitored, and if it is judged to start the forced regeneration, the forced regeneration is performed. In this forced regeneration, there are an automatic regeneration while driving and a manual regeneration that starts when the driver stops the vehicle to push a manual regeneration button 26. These regenerations are suitably selected to be performed depending on mileage or differential pressure value of the DPF. The manual regeneration can solve a problem of oil dilution (dilution of oil), which is caused by mingling unburnt fuel with engine oil (lubrication oil) due to post injection in case of forced regeneration while driving in automatic regeneration occasion during driving. In addition, the automatic regeneration, when there is no oil dilution problem, can mitigate annoying in a case of manual regeneration, which is inputting regeneration control start signal by the driver.

In this forced regeneration, multi-injection and exhaust throttling (while in stand still) are carried out to raise exhaust temperature. When the filter entrance exhaust gas temperature Tg2 or the oxidation catalyst entrance exhaust gas temperature Tg1 becomes equal to or higher than a predetermined temperature (approximately 250° C.), the post injection is carried out to raise the filter entrance exhaust gas temperature Tg2 to perform forced regeneration. The filter entrance exhaust gas temperature Tg2 is detected by the filter entrance exhaust gas temperature sensor 33. The oxidation catalyst entrance exhaust gas temperature Tg1 is detected by the oxidation catalyst entrance exhaust gas temperature sensor 32. Note that these regeneration control devices for forced regeneration are integrated in the control unit 40.

Figure 2:
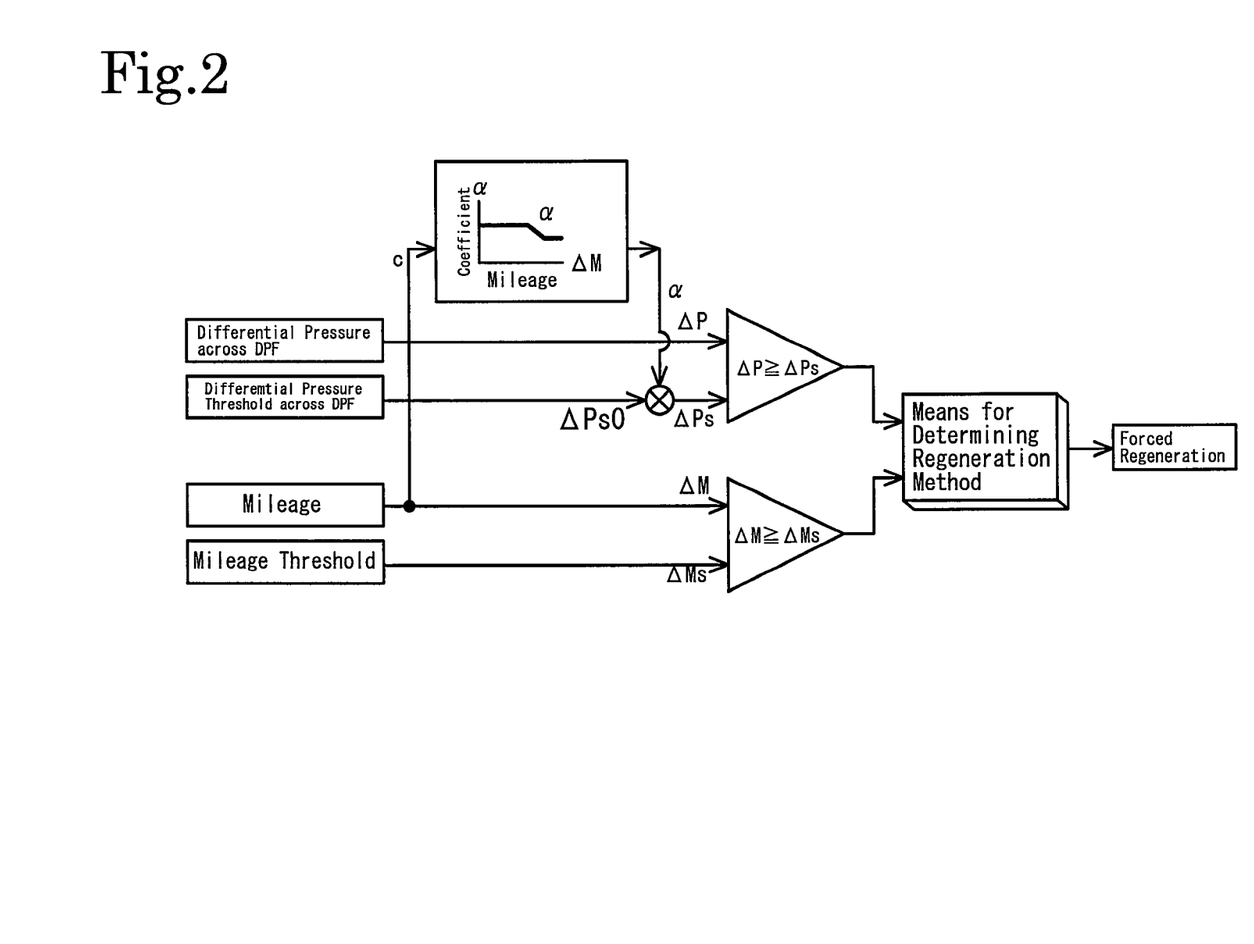
FIG. 2 shows an example of flow of forced regeneration start judgment of an embodiment according to the present invention.

Hereafter, the judging method of the forced regeneration start in the exhaust emission purification system 1 will be described. As shown in FIG. 2, judging of the forced regeneration start uses judgment of forced regeneration start timing based on the comparison of differential pressure across DPF $\Delta P$ with the predetermined differential pressure threshold across DPF $\Delta Ps$, and in addition to the above, judgment of forced regeneration start timing based on the comparison of the mileage of a vehicle $\Delta M$ after the previous forced regeneration with the predetermined mileage threshold $\Delta Ms$.

In the present invention, the differential pressure threshold across DPF $\Delta Ps$ is used to judge forced regeneration start timing based on the comparison of the differential pressure across DPF $\Delta P$ with the predetermined differential pressure threshold across DPF $\Delta Ps$. The predetermined differential pressure threshold across DPF $\Delta Ps$ is set by multiplying a reference differential pressure threshold across DPF $\Delta Ps0$ by a coefficient $\alpha(\Delta Ms)$ which varies depending on the mileage $\Delta M$ of a vehicle after previous forced regeneration.

Figure 3:
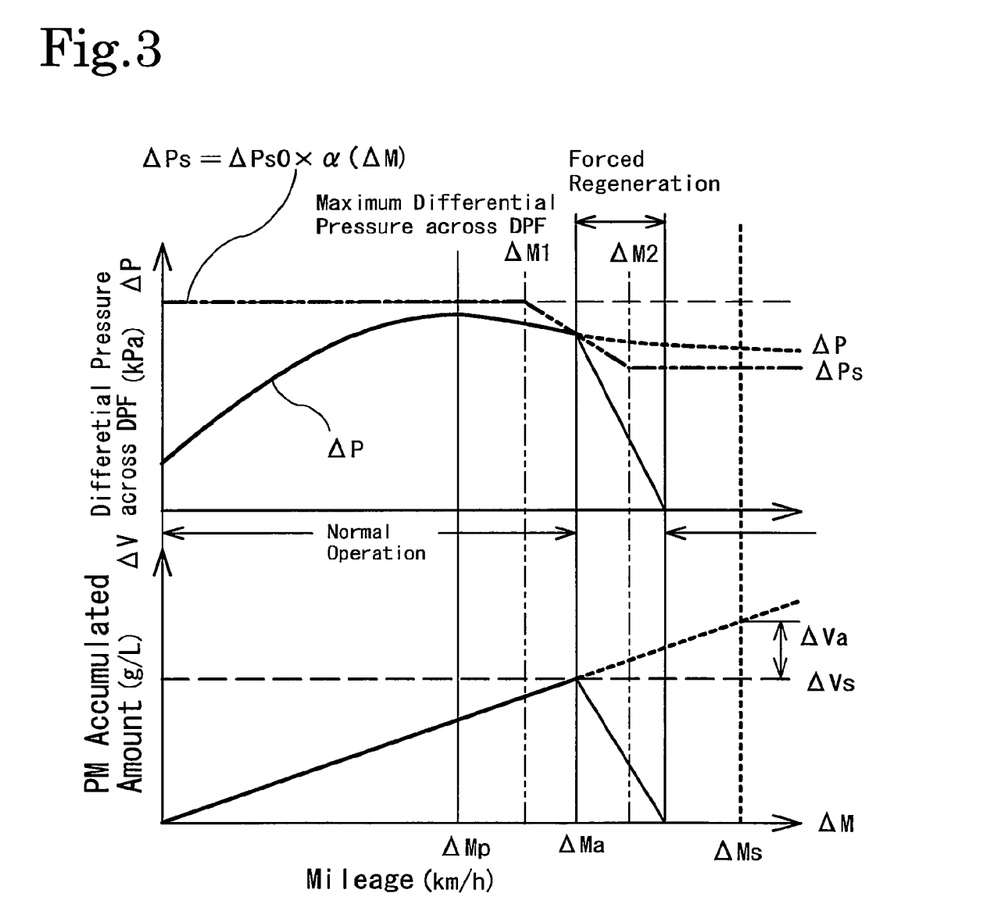
FIG. 3 is a drawing explaining a control of forced regeneration start judgment and the effect thereof.

As shown in FIG. 2 and FIG. 3, in this embodiment the coefficient $\alpha(c)$ is a function of the mileage $\Delta M$ of a vehicle after previous forced regeneration. The $\alpha$ is set to be constant as $\alpha=\alpha 1$ (for example, 1.0) until the mileage $\Delta M$ becomes the first mileage $\Delta M1$. In addition, $\alpha$ is arranged to vary from $\alpha 1$ to $\alpha 2$ (for example, 0.8) linearly ($\alpha=(\alpha 2-\alpha 1)\times(\Delta M-\Delta M1)/(\Delta M2-\Delta M1)+\alpha 1$). Further, $\alpha$ is set to be constant as $\alpha=\alpha 2$, when the mileage $\Delta M$ surpasses the second mileage $\Delta M2$.

Owing to this arrangement, as shown in FIG. 3, although the PM accumulated amount $\Delta V$ increases depending on driving pattern, that is, even in a case where differential pressure across DPF $\Delta P$ becomes maximum value at the mileage of $\Delta Mp$, after which differential pressure $\Delta P$ decreases, the forced regeneration can be judged in a following procedure. That is to say, differential pressure threshold across DPF $\Delta Ps$ is set by multiplying a reference differential pressure threshold across the DPF $\Delta Ps0$ by a coefficient $\alpha$ ($\Delta Ps=\Delta Ps0\times\alpha(\Delta M)$), whereby when the mileage $\Delta M$ reaches the mileage $\Delta Ma$, and then PM accumulated amount $\Delta Vs$ where the forced regeneration is desired to start, the differential pressure across DPF $\Delta P$ reaches the differential pressure threshold across DPF $\Delta Ps$. Hence, it is possible to judge starting of forced regeneration accurately by the differential pressure across DPF $\Delta P$ and the differential pressure threshold across DPF $\Delta Ps$. Therefore, the forced regeneration is carried out before excessive PM accumulation $\Delta Va$ is added, and PM accumulation amount $\Delta V$ and the differential pressure across DPF $\Delta P$ can be decreased.

Consequently, if the differential pressure threshold across DPF $\Delta Ps$ is modified, the frequency of the forced regeneration can be increased. In other words, when the forced regeneration start timing of the catalyst-carried filter device 12b is judged based on the comparison of the differential pressure across the catalyst-carried filter device 12b $\Delta P$ with the predetermined differential pressure threshold $\Delta Ps$ across DPF, the differential pressure threshold $\Delta Ps$ across DPF is set by multiplying a reference differential pressure threshold $\Delta Ps0$ across DPF by a coefficient α(ΔM) which varies depending on the mileage ΔM of a vehicle after previous forced regeneration. Accordingly, the differential pressure judgment threshold across DPF ΔPs is arranged to correspond to the mileage ΔM after forced regeneration so as to be decreased when the mileage ΔM becomes larger. Therefore, the frequency of the forced regeneration is increased.

Owing to the above, PM, which is accumulated unevenly in the catalyst-carried filter device 12b can be removed by burning while the accumulated amount of PM is still small. Therefore, excessive temperature rise in the catalyst-carried filter device 12b resulting from excessive accumulation of PM during forced regeneration and melting-loss of catalyst-carried filter 12b due to excessive temperature rise can be avoided.

Setting of coefficient α(ΔM) in FIG. 2, and FIG. 3 is an example. Another example of setting method of the coefficient α(ΔM) is as follows. For example, when the mileage ΔM equals to 0 km or more and less than 100 km, α1=1.0, equals to 100 km or more and less than 200 km, α2, equals to 200 km or more and less than 300 km, α3, and equals to 300 km or more and less than 400 km, α4, thus diminishing stepwise setting, like α1>α2>α3>α4, may be adopted. Alternatively, such setting may be adopted as decreasing continuously accompanied with increase of the mileage ΔM. Furthermore, stepwise decreasing and continuous decreasing may be combined.

Hereafter, control of the exhaust emission purification system 1 will be described referring a control flow. In the control, PM is captured in normal operation. In the normal operation, whether it is a regeneration timing or not is monitored and if it is judged the regeneration timing, warning is given or the automatic regeneration while running is performed. In a case of warning, forced regeneration is performed when the driver who received the warning stops the vehicle and operates the manual regeneration button 26.

Figure 4:
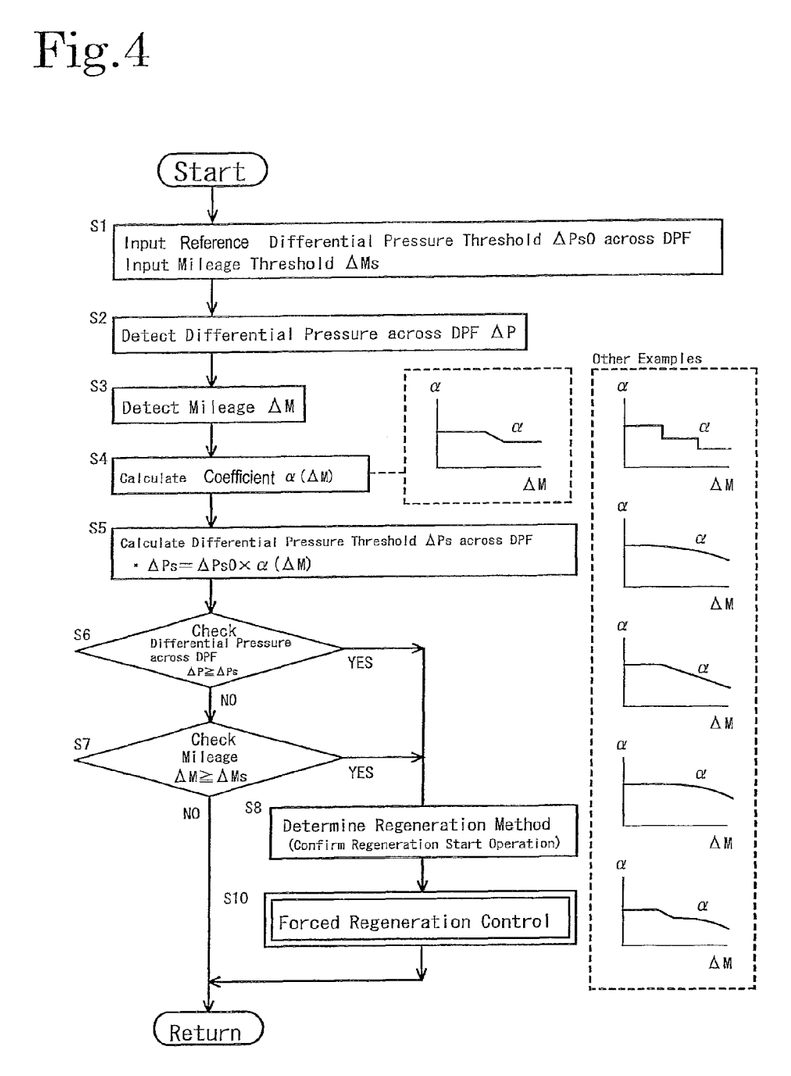
FIG. 4 is a drawing showing an example of determination control flow of forced regeneration.
Figure 5:
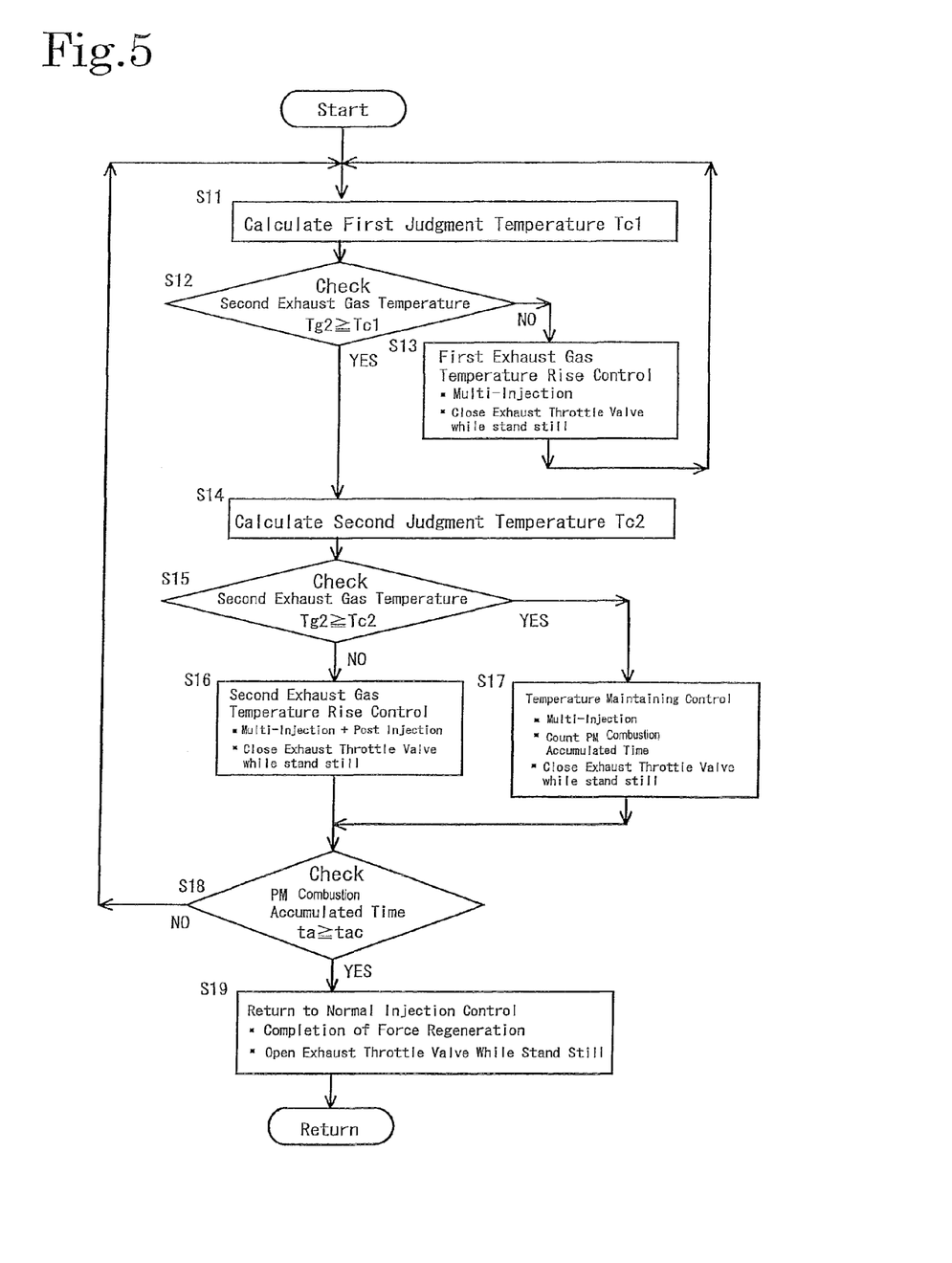
FIG. 5 is a drawing showing an example of control flow of forced regeneration.

The forced regeneration of manual regeneration or automatic regeneration is carried out according to the control flow exemplified in FIG. 4 or FIG. 5 in this embodiment. The control flow to judge the forced regeneration start in FIG. 4 is shown so that the forced regeneration is called to perform from the upper level of control flow which controls normal operation when normal operation is going, whenever to judge whether the forced regeneration is required or not.

When the forced regeneration is judged not to be required in this control flow, the procedure returns to the upper level control flow as it is to continue normal operation. At the judgment timing to judge whether the next forced regeneration is required or not, the control is called again and if the control flow judges the forced regeneration is required, the forced regeneration is carried out in step S10 of this control step. Thereafter, returning to the upper level control flow to continue the normal operation, then at the judgment timing to judge whether the next regeneration is required or not it is called again.

In the control flow in FIG. 4, when the procedure starts after it was called, the reference differential pressure threshold across DPF ΔPs0 and the mileage threshold ΔMs are input in step S1. In the next step S2, the differential pressure across DPF ΔP is detected by the differential pressure sensor 31. In the next step S3, the mileage ΔM after the previous forced regeneration is detected.

In the subsequent step S4, the coefficient α(ΔM) is calculated from the detected mileage ΔM. The calculation is carried out using the map data (table data) which has been set and input or function, and the like. In the following step S5, the reference differential pressure threshold across DPF ΔPs0 is multiplied by the calculated coefficient α(ΔM) to calculate the differential pressure threshold across DPF ΔPs.

In the next step S6, the forced regeneration start is judged by the differential pressure across DPF ΔP. Here, comparing the differential pressure across DPF ΔP with the differential pressure threshold across DPF ΔPs, whether the differential pressure ΔP across DPF is equal to or more than the differential pressure threshold across DPF ΔPs or not is judged. If ΔP≥ΔPs is not satisfied (NO), the forced regeneration start is not judged, but the procedure goes to step S7, where the forced regeneration is judged by the mileage ΔM. If ΔP≥ΔPs is satisfied (YES), the forced regeneration is judged to start and the procedure goes to step S8.

In step S7, the forced regeneration start is judged by the mileage ΔM. Here, the mileage ΔM is compared with the mileage threshold ΔMs to check whether the mileage ΔM is equal to or more than the mileage threshold ΔMs. If ΔM≥ΔMs is not satisfied (NO), the forced regeneration is not judged to start, and the procedure goes to return. If ΔM≥ΔMs is satisfied (YES), the forced regeneration is judged to start, and the procedure goes to step S8.

In step S8, the regeneration method, which is, manual regeneration or automatic regeneration, is determined. When the forced regeneration condition is satisfied, the procedure goes to the forced regeneration control of step S10. After completion of the forced regeneration control of step S10, the procedure returns.

It should be noted that, in the determination step of the regeneration method, when the forced regeneration is by the manual regeneration control, a flasher (DPF lump) 23 which is a warning means is made to light on and off to urge the driver for the manual regeneration of DPF. When the driver urged to carry out the forced regeneration stops the vehicle and operates the manual regeneration button 26, the forced regeneration control is brought about. If it is the forced regeneration control in the automatic regeneration, the forced regeneration is brought about as it is. To judge whether it is manual regeneration or automatic regeneration, known method can be used. For example, if the problem of dilution is considered to happen when the forced regeneration is carried out during running, depending on progress of vehicle operation state after the previous forced regeneration, manual regeneration should be the case, and if the problem of dilution is considered not to happen despite that the forced regeneration is carried out during running, automatic regeneration should be the case.

The forced regeneration of step S10 is carried out according to the control flow exemplified in FIG. 5. In the control flow of FIG. 5, the second exhaust gas temperature Tg2 detected by the filter entrance exhaust gas temperature sensor 33 is used as a catalyst temperature indication temperature which indicates the oxidation catalyst temperature (bed temperature). When the second exhaust gas temperature Tg2 becomes equal to or higher than the predetermined first judgment temperature Tc1, unburnt fuel is supplied to the upstream side of the oxidation catalyst device 12a via the post injection. In addition, the second exhaust gas temperature Tg2 detected by the filter entrance exhaust gas temperature sensor 33 is used too as a filter temperature indication temperature which indicates the temperature of the catalyst-carried filter device 12b. When the second exhaust gas temperature Tg2 becomes equal to or higher than the predetermined second judgment temperature Tc2, the post injection is not carried out but the temperature maintaining control is carried out via multi-injection.

When the control flow of FIG. 5 starts, in step S11 the first judgment temperature Tc1 is calculated. The first judgment temperature Tc1 is a temperature at which unburnt fuel HC supplied by the post injection is oxidized satisfactorily via oxidation catalyst of the oxidation catalyst device 12a when the second exhaust gas temperature (indication temperature of the oxidation temperature) Tg2 becomes the same temperature (for example, approximately 250° C.). The second exhaust gas temperature Tg2 is an exhaust gas temperature detected by the filter entrance exhaust gas temperature sensor 33. For the first judgment temperature Tc1, a variable value depending on engine speed at that time may be used. In stead of the second exhaust gas temperature Tg2, the first exhaust gas temperature Tg1 detected by the oxidation catalyst entrance exhaust gas temperature sensor 32 may be used.

In the next step S12, the second exhaust gas temperature (indication temperature of catalyst temperature) Tg2 is checked. When the second exhaust gas temperature Tg2 is lower than the first judgment temperature Tc1 calculated in step S11, the first exhaust gas temperature rise control is carried out in step S13 during the predetermined time Δt1 (the time related to check interval of the second exhaust gas temperature Tg2 of step S13).

In the first exhaust gas temperature rise control, the multi-injection based on the map data for the first multi-injection is carried out without any post injection. That is, during the multi-injection control, multi-injection is carried out based on calculation result of injection amount and injection timing of the multi-injection referring to the map data for the first multi-injection taking engine rotation and fuel injection amount which have been detected. The fuel injection amount is calculated from an acceleration opening and the like that have been detected. The first multi-injection map data that determines injection amount and injection timing of the multi-injection is a map data based on the engine speed and fuel injection, in other words, the fuel injection amount which is calculated from detected acceleration opening and the like. This map data has been set in advance by experiments or calculations and the like to be input to the control unit. This multi-injection increases injection amount of the multi-injection and delays injection timing of the multi-injection behind the fuel injection timing when in a normal operation. This multi-injection enhances temperature rise efficiency of the exhaust gas and contrives quick temperature rise of the exhaust gas.

It should be noted that in order to improve temperature rise efficiency of the exhaust gas, an exhaust brake valve 14 is used simultaneously when the vehicle stands still. The operation closing of the exhaust brake valve 14 blocks heat from escaping and increases engine load. Consequently, the exhaust gas temperature rises efficiently in short time and temperature rise efficiency of the oxidation catalyst device 12a is improved.

After step S13, the procedure returns to step S11. In the judgment of step S12, if the second exhaust gas temperature Tg2 is equal to or higher than the predetermined first judgment temperature Tc1, the procedure goes to step S14. Alternatively, the following can be adopted as well. That is, as the indication temperature of the oxidation catalyst that indicates the oxidation catalyst temperature, both of the second exhaust gas temperature Tg2 detected by the filter entrance exhaust gas temperature sensor 33 and the first exhaust gas temperature Tg1 detected by the oxidation catalyst entrance exhaust gas temperature sensor 32 are used. As the predetermined judgment temperature for each of the two, the first judgment temperature Tc1 and the third judgment temperature Tc3 are used respectively. When the second exhaust gas temperature Tg2 surpasses the first judgment temperature Tc1 and the first exhaust gas temperature Tg1 surpasses the third judgment temperature Tc3, unburnt fuel is supplied to the upstream side of the oxidation catalyst device 12a.

In step S14, the second judgment temperature Tc2 is calculated. The second judgment temperature Tc2 is a target temperature of the second exhaust gas temperature rise control of step S16. Through maintaining the second exhaust gas temperature (indication temperature of filter temperature) Tg2 above the temperature Tc2, combustion of PM captured in the catalyst-carried filter device 12b is kept in good state. The second exhaust gas temperature Tg2 is an exhaust gas temperature detected by the filter entrance exhaust gas temperature sensor 33. The second judgment temperature Tc2 is arranged normally to be higher than the PM combustion start temperature (for example, approximately 350° C.), which is more or less 500° C., for example. Alternatively, the second judgment temperature Tc2 may be varied in a multi-step manner depending on time.

In the next step S15, the second exhaust gas temperature (indication temperature of filter temperature) Tg2 is checked. When the second exhaust gas temperature Tg2 is lower than the second predetermined judgment temperature Tc2, the procedure goes to the second exhaust gas temperature control of step S16. When the second exhaust gas temperature Tg2 is not less than the second judgment temperature Tc2, the procedure goes to temperature maintain control of step S17.

In step S16, the second exhaust gas temperature rise control is carried out during the predetermined time (time related to check interval of the second exhaust gas temperature Tg2 of step S15) Δt2. In the second exhaust gas temperature rise control, a multi-injection is carried out based on the map data for the second multi-injection which is different from the map data for the first multi-injection. The map data which determines injection amount and injection timing of the multi-injection is a map data, same as the map data for the first multi-injection, based on engine rotation and fuel injection amount, in other words, the fuel injection amount which is calculated from detected acceleration opening and the like. This map data has been set in advance by experiments or calculations and the like to be input to the control unit.

In this multi-injection, the injection amount of the multi-injection is decreased as less as necessary to maintain the exhaust gas temperature, and as for the injection timing of the multi-injection, injection timing delay is arranged to be less than in the first exhaust gas temperature rise control of step S13. This multi-injection maintains the exhaust gas temperature to a certain extent. At the same time, while supplying fuel to the oxidation catalyst device 12a via post injection, the fuel is oxidized by the oxidation catalyst to raise the exhaust gas temperature flowing into the catalyst-carried filter 12b.

It should be noted that in order to improve temperature rise efficiency of the exhaust gas temperature, an exhaust throttle valve 15 is used simultaneously when the vehicle stands still. When the exhaust brake valve 14 is opened fully and the exhaust throttle valve 15 is closed completely, passage area is enlarged compared with when the exhaust brake valve 14 is closed and thereby the engine load is reduced. Owing to this, the temperature rise in a cylinder is reduced and the post injection becomes feasible.

Then, the exhaust gas temperature rise is maintained by the multi-injection through the second exhaust gas temperature rise control, at the same time unburnt fuel (HC) is supplied to the exhaust gas via post injection. This unburnt fuel is oxidized by the oxidation catalyst device 12a. The exhaust gas temperature can be raised further by this oxidation heat. When the raised exhaust gas temperature Tg2 reaches equal to or higher than the second judgment temperature Tc2, PM which is captured in the catalyst-carried filter device 12b burns. It should be noted that, in the second exhaust gas temperature rise control, the exhaust gas temperature Tg2 may be raised continuously to temperature Tc2, which is the control target, or may be raised in two steps as well as in multi-steps. After step S16, the procedure goes to step S18.

In the judgment of step S15, in a case where the second exhaust gas temperature Tg2 is equal to or higher than the second judgment temperature Tc2, temperature maintaining control is carried out during the predetermined time duration (time related to check interval of the maintaining time of the second exhaust gas temperature Tg2 in step S15) Δt3. In this maintaining time control, the multi-injection is carried out rather than the post injection in terms of injection in a cylinder (in a tube) of the engine 10.

In step S17, the accumulation time of PM combustion is counted. As for this counting, PM combustion accumulation time ta is counted exclusively when the second exhaust gas temperature Tg2 is equal to or higher than the second judgment temperature Tc2 (ta=ta+Δt3). After step S17, the procedure goes to step S18.

In step S18, PM combustion accumulation time ta is checked to judge whether the regeneration is completed or not. In this check, whether PM combustion accumulation time ta surpasses the predetermined judgment time Tac or not is checked. If surpassing, the regeneration is regarded as completed and the procedure goes to step S19. If not surpassing, the regeneration is regarded as not completed, the procedure returns to step S11. In that case, until PM combustion accumulated time ta surpasses the predetermined judgment time tac, the first exhaust gas temperature rise control of step S13, or the second exhaust gas temperature rise control of step S16, or the temperature maintaining control of step S17 is carried out.

In step S19, the forced regeneration is completed. And the exhaust brake valve 14 or the exhaust throttle valve 15 is operated to return to the normal operation state, if the vehicle stands still. After, the procedure returns.

Owing to this forced regeneration control, when the second exhaust gas temperature (indication temperature of catalyst temperature) Tg2 is lower than the first judgment temperature Tc1 while in the forced regeneration, the first exhaust gas temperature rise control S13 is carried out in which the multi-injection is performed that does not go with the post injection in the fuel injection control in the cylinder. When the second exhaust gas temperature TG2 is equal to or higher than the first judgment temperature Tc1, the second exhaust gas temperature rise control S16 is carried out in which the post injection is performed in addition to the multi-injection in the fuel injection control in the cylinder. The second exhaust gas temperature Tg2 is the exhaust gas temperature detected by the filter entrance exhaust gas temperature sensor 33, that is, the exhaust gas temperature that flows into the catalyst-carried filter device 12b.

According to the exhaust emission purification method and the exhaust emission purification system 1, since the frequency of the forced regeneration becomes higher compared with the case where the differential pressure threshold across DPF ΔPs is set constant regardless the mileage ΔM, PM accumulated unevenly in the catalyst-carried filter device 12b can be removed through combustion while the PM accumulated amount ΔV is still small. Consequently, excessive temperature rise in the catalyst-carried filter device 12b resulting from excessive accumulation amount of PM while the forced regeneration is in operation, can be prevented. At the same time, the melting-loss of the catalyst-carried filter device 12b due to excessive temperature rise can be prevented.

In the embodiment described above, as an exhaust gas purification device of the exhaust emission purification system, description has been made taking an example of combination of an oxidation catalyst device 12a in the upstream side with a catalyst-carried filter 12b in the downstream side. However, a filter supporting oxidation catalyst may be accepted. Moreover, the post injection has been described as a method to supply unburnt fuel (HC) to the upstream side of the oxidation catalyst 12a. However, such a method of direct injection in exhaust tube 11 may be adopted that an unburnt fuel supply device is disposed in the exhaust passage 11 to inject directly unburnt fuel in the exhaust tube 11 from the unburnt fuel supply device.

INDUSTRIAL APPLICABILITY

The control method of the exhaust emission purification system and the exhaust emission purification system according to the present invention that have an excellent effect as described so far can be utilized effectively very much for an exhaust emission purification system provided in an internal combustion engine and the like mounted on a vehicle.

What is claimed is:

1. An exhaust emission purification method for an exhaust emission purification device having a diesel particulate filter in an exhaust passage in an internal combustion engine mounted on a vehicle, which filter is capable of regeneration, comprising:
   judging a forced regeneration start timing of the filter based on a comparison of a differential pressure across the filter with a predetermined differential pressure threshold across the filter;
   performing forced regeneration repeatedly; and
   setting the predetermined differential pressure threshold by multiplying a reference differential pressure threshold across the filter by a coefficient which is calculated on a mileage of the vehicle after previous forced regeneration,
   wherein the coefficient decreases as the mileage increases.

2. The method according to claim 1, further comprising:
   also making the coefficient a function of the mileage of the vehicle after the previous forced regeneration; and
   judging the forced regeneration start timing based on a comparison of the mileage with a predetermined mileage threshold.

3. The method according to claim 2,
   wherein the regeneration includes a manual regeneration which performs a forced regeneration control after receiving a signal of a forced regeneration start that is input by a user of the vehicle when a forced regeneration start timing is judged and a warning is given to the user, and an automatic regeneration which performs a forced regeneration control automatically when a forced regeneration start timing is judged.

4. The method according to claim 1, wherein the regeneration includes a manual regeneration which performs a forced regeneration control after receiving a signal of a forced regeneration start that is input by a user of the vehicle when the forced regeneration start timing is judged and a warning is given to the user, and an automatic regeneration which performs the forced regeneration control automatically when the forced regeneration start timing is judged.

5. The method according to claim 1, further comprising decreasing the coefficient at least one of stepwise or continuous.

6. An exhaust emission purification system, comprising:
   an exhaust emission purification device provided with a diesel particulate filter for an internal combustion engine mounted on a vehicle; and
   a control unit programmed to judge a forced regeneration start timing of the filter based on a comparison of a differential pressure across the filter with a predetermined differential pressure threshold across the filter, to repeatedly perform forced regeneration, and to set the predetermined differential pressure threshold by multiplying a reference differential pressure threshold across the filter by a coefficient which is calculated on a mileage of the vehicle after previous forced regeneration, and wherein the coefficient decreases as the mileage increases.

7. The system according to claim 6,
wherein the control unit is also programmed to make the coefficient a function of the mileage of the vehicle after the previous forced regeneration, and
to judge the forced regeneration start timing based on a comparison of the mileage with a predetermined mileage threshold.

8. The exhaust emission purification system according to claim 7,
wherein the control unit is programmed to carry out a manual regeneration which performs a forced regeneration control after receiving a signal that is input from a user of the vehicle when a forced regeneration start timing is judged and a warning is given to the user, and an automatic regeneration which performs a forced regeneration control automatically when the forced regeneration start timing is judged.

9. The exhaust emission purification system according to claim 6,
wherein the control unit is programmed to carry out a manual regeneration which performs a forced regeneration control after receiving a signal that is input from a vehicle user when a forced regeneration start timing is judged and a warning is given to the vehicle user, and an automatic regeneration which performs the forced regeneration control automatically when the forced regeneration start timing is judged.

10. The system according to claim 6, wherein the coefficient decrease is at least one of stepwise or continuous.

* * * * *